United States Patent
Lee et al.

(10) Patent No.: US 10,897,718 B2
(45) Date of Patent: Jan. 19, 2021

(54) METHOD AND DEVICE FOR PERFORMING BEAM REFINEMENT IN WIRELESS COMMUNICATION SYSTEM

(71) Applicant: LG ELECTRONICS INC., Seoul (KR)

(72) Inventors: Kilbom Lee, Seoul (KR); Kijun Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 16/331,955

(22) PCT Filed: Sep. 8, 2017

(86) PCT No.: PCT/KR2017/009883
§ 371 (c)(1),
(2) Date: Mar. 8, 2019

(87) PCT Pub. No.: WO2018/048250
PCT Pub. Date: Mar. 15, 2018

(65) Prior Publication Data
US 2019/0246290 A1 Aug. 8, 2019

Related U.S. Application Data

(60) Provisional application No. 62/385,266, filed on Sep. 9, 2016.

(51) Int. Cl.
*H04W 16/28* (2009.01)
*H04W 74/08* (2009.01)
(Continued)

(52) U.S. Cl.
CPC .......... *H04W 16/28* (2013.01); *H04B 7/0617* (2013.01); *H04B 7/0695* (2013.01);
(Continued)

(58) Field of Classification Search
CPC ............. H04W 72/042; H04W 72/044; H04W 72/0453; H04W 76/10; H04W 76/19;
(Continued)

(56) References Cited

U.S. PATENT DOCUMENTS

2013/0208678 A1  8/2013  Zhang
2016/0095102 A1  3/2016  Yu et al.
(Continued)

FOREIGN PATENT DOCUMENTS

CN  108702635 A  * 10/2018  ............ H04W 16/28
CN  109982378 A  *  7/2019  ............ H04W 74/08
(Continued)

OTHER PUBLICATIONS

PCT International Application No. PCT/KR2017/009883, Written Opinion of the International Searching Authority dated Dec. 15, 2017, 21 pages.
(Continued)

*Primary Examiner* — Afsar M Qureshi
(74) *Attorney, Agent, or Firm* — Lee, Hong, Degerman, Kang & Waimey PC

(57) ABSTRACT

A method for a terminal performing beam refinement in an mmWave communication system can be provided according to an embodiment of the present description. A method for a terminal performing beam refinement can comprise the steps of: transmitting a RACH preamble to a base station; receiving a RACH response from the base station; transmitting an RRC connection request message to the base station; and receiving a response message to the RRC connection request message. If beam inconsistency occurs in the terminal, ID information of a pre-connected terminal can be comprised in a terminal ID field of the RRC connection request message.

10 Claims, 13 Drawing Sheets

(51) Int. Cl.
  *H04B 7/06* (2006.01)
  *H04W 76/10* (2018.01)
  *H04W 72/04* (2009.01)
  *H04W 76/19* (2018.01)
(52) U.S. Cl.
  CPC ....... *H04W 72/042* (2013.01); *H04W 72/044* (2013.01); *H04W 74/0833* (2013.01); *H04W 76/10* (2018.02); *H04W 76/19* (2018.02)
(58) Field of Classification Search
  CPC  H04W 74/0833; H04B 7/0617; H04B 7/0695
  USPC ......................................................... 370/330
  See application file for complete search history.

(56) References Cited

U.S. PATENT DOCUMENTS

2016/0099763 A1* 4/2016 Chen .................... H04B 7/0617
                                                         370/329
2017/0195031 A1* 7/2017 Onggosanusi ........ H04L 5/0048
2017/0231011 A1* 8/2017 Park .................... H04W 74/006

FOREIGN PATENT DOCUMENTS

EP         2798875 B1 * 11/2018  .......... H04W 74/002
WO   WO-2014069164 A1 *  5/2014  ........... H04B 17/309

OTHER PUBLICATIONS

Cisco, et al., "Verizon 5G TF; Air Interface Working Group; Verizon 5th Generation Radio Access; Physical layer procedures (Release 1)," TS V5G.213 v1.0, Jun. 2016, 45 pages.

Samsung, "RAN2 issues of beam tracking in multi-beam based NR", 3GPP TSG RAN WG2 Meeting #95, R2-165172, Aug. 2016, 6 pages.

* cited by examiner

METHOD AND DEVICE FOR PERFORMING BEAM REFINEMENT IN WIRELESS COMMUNICATION SYSTEM

CROSS-REFERENCE TO RELATED APPLICATIONS

This application is the National Stage filing under 35 U.S.C. 371 of International Application No. PCT/KR2017/009883, filed on Sep. 8, 2017, which claims the benefit of U.S. Provisional Application No. 62/385,266, filed on Sep. 9, 2016, the contents of which are all hereby incorporated by reference herein in their entireties.

TECHNICAL FIELD

The present specification relates to a wireless communication system, and more particularly, to a method of performing beam refinement by considering a beam mismatch in a system and an apparatus therefor.

BACKGROUND ART

An ultrahigh frequency wireless communication system based on mmWave is configured to operate at a center frequency of several GHz to several tens of GHz. Due to the characteristic of the center frequency, a pathloss may considerably occur in a radio shadow area. It is necessary to elaborately design beamforming of a signal transmitted to a user equipment, control occurrence of a beam mismatch, and prevent the beam mismatch in consideration of the pathloss in the mmWave communication system.

DISCLOSURE OF THE INVENTION

Technical Task

Accordingly, the present invention is directed to a method of performing beam refinement that substantially obviates the above-described problems.

One technical task of the present invention is to provide a method of performing beam refinement using a Random Access CHannel (RACH) procedure in a wireless communication system.

Another technical task of the present invention is to provide a Downlink Control Information (DCI) format for providing beam refinement information.

Further technical task of the present invention is to provide a method of omitting an unnecessary procedure in case of performing beam correction.

Technical Solutions

In one technical aspect of the present specification, provided herein is a method of performing beam refinement by a User Equipment (UE) in an mmWave communication system, the method including transmitting a Random Access CHannel (RACH) preamble to a base station, receiving an RACH response from the base station, transmitting an RRC connection request message to the base station, and receiving a response message in response to the RRC connection request message, wherein if a beam mismatch occurs in the user equipment, ID information of the already-connected user equipment is included in a UE ID field of the RRC connection request message.

In another technical aspect of the present specification, provided herein is a user equipment performing beam refinement in an mmWave communication system, the user equipment including a receiving unit receiving a signal from an external device, a transmitting unit transmitting the signal to the external device, and a processor configured to control the receiving unit and the transmitting unit, wherein the processor is further configured to transmit a Random Access CHannel (RACH) preamble to a base station using the transmitting unit, receive an RACH response from the base station using the receiving unit, transmit an RRC connection request message to the base station using the transmitting unit, and receive a response message in response to the RRC connection request message using the receiving unit and wherein if a beam mismatch occurs in the user equipment, ID information of the already-connected user equipment is included in a User Equipment (UE) ID field of the RRC connection request message.

The following matters are applicable in common to a method and apparatus for performing beam refinement in an mmWave communication system.

According to one embodiment of the present specification, the base station may detect the beam mismatch based on the UE ID field.

According to one embodiment of the present specification, if the base station detects the beam mismatch, the user equipment may receive the response message including beam change indication information in response to the RRC connection request message.

According to one embodiment of the present specification, at least one of a Channel State Information-Reference Signal (CSI-RS) request field and Channel State Information (CSI) may be included in the RRC connection request message.

According to one embodiment of the present specification, if the CSI-RS request field is set to a first value, the user equipment may receive information on a CSI-RS from the base station and the information on the CSI-RS may be received through at least one of Downlink Control Information (DCI) and Medium Access Control-Control Element (MAC-CE).

According to one embodiment of the present specification, at least one of a CSI-RS process reuse field, a CSI-RS resource allocation field and a CSI-RS process selection field may be received together with the information on the CSI-RS.

According to one embodiment of the present specification, the CSI-RS resource allocation field may indicate time and frequency resource information for transmitting the CSI-RS and the CSI process selection field may indicate a process used for the CSI-RS transmission.

According to one embodiment of the present specification, if the CSI-RS process reuse field is set to a first value, scheduling information on CSI-RS process configuration may be received together with the information on the CSI-RS.

According to one embodiment of the present specification, the CSI information may be Beam State Information (BSI) and the CSI-RS may be a Beam Refinement Reference Signal (BRRS).

According to one embodiment of the present specification, the CSI-RS request field may be a BRRS request field, the CSI-RS process reuse filed may be a BRRS process reuse field, the CSI-RS resource allocation field may be a BRRS resource allocation field, the CSI-RS process selection field may be a BRRS process selection field, and the CSI-RS process configuration may be BRRS process configuration.

Advantageous Effects

The present specification can provide a beam refinement performing method.

The present specification can provide a method of performing beam refinement using an RACH procedure in a wireless communication system.

The present invention can provide a DCI format for providing beam refinement information.

The present invention can provide a method of omitting an unnecessary procedure in case of performing beam correction.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR INVENTION

Figure 1:
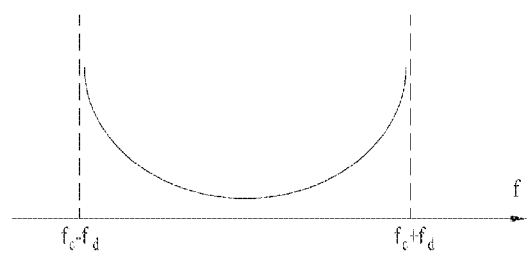
FIG. 1 is a diagram illustrating a Doppler spectrum.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Communication System Using Ultrahigh Frequency Band

In an LTE (Long Term Evolution)/LTE-A (LTE Advanced) system, an error value of oscillators between a UE and an eNB is defined by requirements as follows.

UE side frequency error (in TS 36.101)

The UE modulated carrier frequency shall be accurate to within ±0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
| --- | --- |
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, this offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

TABLE 2

| Center frequency | Oscillator Offset | | | |
| --- | --- | --- | --- | --- |
| (subcarrier spacing) | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25 kHz is used, whereby throughput degradation is avoided considering Doppler effect for each center frequency. The above Table 2 is a simple example, and it will be apparent that another subcarrier spacing may be used for the center frequency.

Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler} = (v/\lambda)\cos\theta$. At this time, v is a moving speed of the UE, and $\lambda$ means a wavelength of a center frequency of a radio wave which is transmitted. $\theta$ means an angle between the radio wave and a moving direction of the UE. Hereinafter, description will be given on the assumption that $\theta$ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \qquad \text{[Equation 1]}$$

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $f_c$ and a maximum Doppler spread value is $f_d$.

Figure 2:
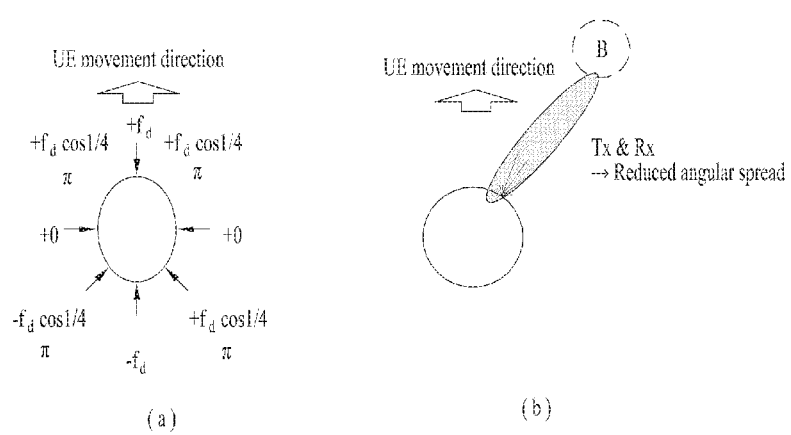
FIG. 2 is a diagram illustrating narrow beamforming related to the present invention.
Figure 3:
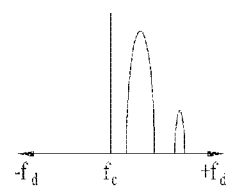
FIG. 3 is a diagram illustrating a Doppler spectrum when narrow beamforming is performed.

FIG. 2 is a diagram illustrating narrow beamforming related to the present invention, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

The aforementioned wireless communication system using the ultrahigh frequency band operates on a band having a center frequency ranging from several GHz to several tens of GHz. The characteristics of such a center frequency further worsen Doppler Effect generated from migration of a user equipment or influence of CFO due to an oscillator difference between a transmitter and a receiver.

Figure 4:
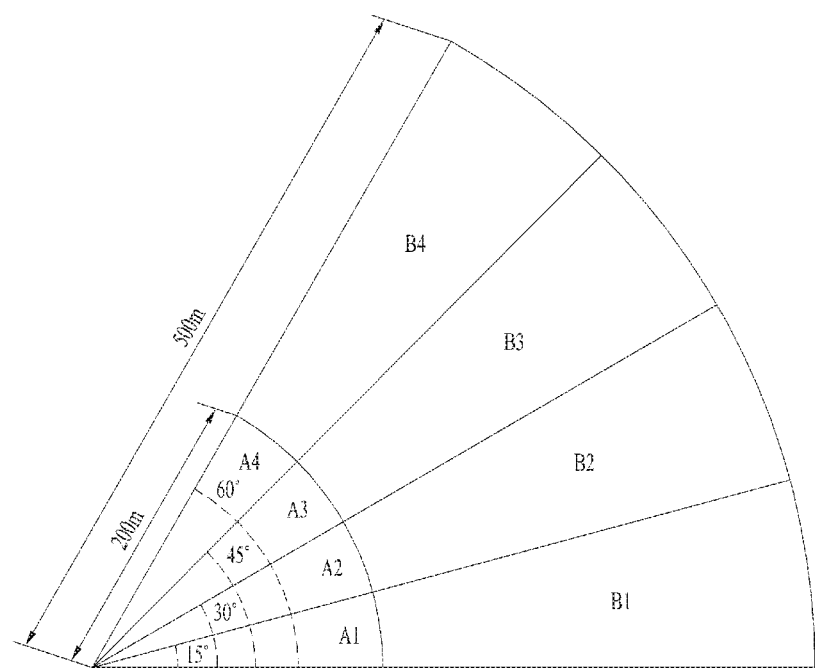
FIG. 4 is a diagram showing an example of a synchronization signal service area of a base station.

FIG. 4 is a diagram showing an example of a synchronization signal service area of a base station.

A user equipment (hereinafter abbreviated UE) performs synchronization with a base station using a downlink (DL) synchronization signal transmitted by the base station. In such a synchronization procedure, timing and frequency are synchronized between the base station and the UE. In order to enable UEs in a specific cell to receive and use a synchronization signal in a synchronization procedure, the base station transmits the synchronization signal by configuring a beam width as wide as possible.

Meanwhile, in case of an mmWave communication system that uses a high frequency band, a path loss in synchronization signal transmission appears greater than that of a case of using a low frequency band. Namely, a system using a high frequency band has a supportable cell radius reduced more than that of a related art cellular system (e.g., LTE/LTE-A) using a relatively low frequency band (e.g., 6 GHz or less).

As a method for solving the reduction of the cell radius, a synchronization signal transmitting method using a beamforming may be used. Although a cell radius increases in case of using a beamforming, a beam width is reduced disadvantageously. Equation 2 shows variation of a received signal SINR according to a beam width.

$$W \to M^{-2}W$$

$$SINR \to M^2 SINR \qquad \text{[Equation 2]}$$

If a beam width is reduced by M-2 time according to a beamforming, Equation 2 indicates that a received SINR is improved by M2 times.

Beside such a beamforming scheme, as another method for solving the cell radius reduction, it is able to consider a scheme of transmitting a same synchronization signal repeatedly. In case of such a scheme, although an addition resource allocation is necessary or a time axis, a cell radius can be advantageously increased without a decrease of a beam width.

Meanwhile, a base station allocates a resource to each UE by scheduling a frequency resource and a time resource located in a specific section. In the following, such a specific section shall be defined as a sector. In the sector shown in FIG. 4, A1, A2, A3 and A4 indicate sectors having widths of 0~15', 15~30', 30~45' and 45~60' in radius of 0~200 m, respectively. B1, B2, B3 and B4 indicate sectors having widths of 0~15', 15~30', 30~45' and 45~60' in radius of 200~500 m, respectively. Based on the substance shown in FIG. 4, sector 1 is defined as {A1, A2, A3, A4} and sector 2 is defined as {A1, A2, A3, A4, B1, B2, B3, B4}. Moreover, if a current synchronization signal service area of a base station is the sector 1, in order for the base station to service a synchronization signal for the sector 2, assume that an additional power over 6 dB is required for a transmission of a synchronization signal.

First of all, in order to service the sector 2, the base station can obtain an additional gain of 6 dB using a beamforming scheme. Through such a beamforming process, a service radius can be extended from A1 to B1. Yet, since a beam width is reduced through the beamforming, A2 to A3 cannot be serviced simultaneously. Hence, when a beamforming is performed, a synchronization signal should be sent to each of the A2~B2, A3~B3, and A4~B4 sectors separately. So to speak, in order to service the sector 2, the base station should transmit the synchronization signal by performing the beamforming four times.

On the other hand, considering the aforementioned repetitive transmission of the synchronization signal, the base station may be able to transmit the synchronization signal to the whole sector 2. Yet, the synchronization signal should transmit the synchronization signal on a time axis repeatedly four times. Consequently, a resource necessary to service the sector 2 is identical for both a beamforming scheme and a repetitive transmission scheme.

Yet, since a beam width is narrow in case of to beamforming scheme, a UE moving fast or a UE located on a sector boundary has difficulty in receiving a synchronization signal stably. Instead, if an ID of a UE located beam is identifiable, a UE can advantageously grasp its location through a synchronization signal. On the contrary, since a beam width is wide in case of a repetitive transmission scheme, it is less probable that a UE misses a synchronization signal. Instead, the UE is unable to grasp its location.

Figure 5:
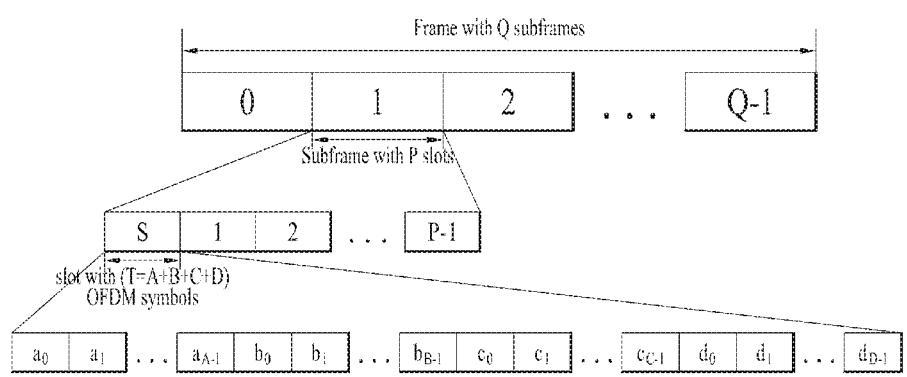
FIG. 5 shows an example of a frame structure proposed in a communication environment that uses mmWave.

FIG. 5 shows an example of a frame structure proposed in a communication environment that uses mmWave.

First of all, a single frame is configured with Q subframes, and a single subframe is configured with P slots. And, one slot is configured with T OFDM symbols. Here, unlike other subframes, a first subframe in a frame uses 0th slot (slot denoted by 'S') for the usage of synchronization. And, the 0th slot is configured with A OFDM symbols for timing and frequency synchronization, B OFDM symbols for beam scanning, and C OFDM symbols for informing a UE of system information. And, the remaining D OFDM symbols are used for data transmission to each UE.

Meanwhile, such a frame structure is a simple example only. Q, P, T, S, A, B, C and D are random values, and may include values set by a user or values set automatically on a system.

In the following, algorithm of timing synchronization between a base station and a UE is described. Let's consider a case that the base station transmits the same synchronization signal A times in FIG. 5. Based on the synchronization signal transmitted by the base station, the UE performs timing synchronization using the algorithm of Equation 3.

$$\hat{n} = \arg\max_{\tilde{n}} \frac{\left|\sum_{i=0}^{A-2} y_{\tilde{n},i}^H y_{\tilde{n},i+1}\right|}{\sum_{i=0}^{A-2} |y_{\tilde{n},i}^H y_{\tilde{n},i+1}|} \quad \text{[Equation 3]}$$

where $$y_{\tilde{n},i} \triangleq r[\tilde{n}+i(N+N_g):\ \tilde{n}+i(N+N_g)+N-1]$$

In Equation 3, N, Ng and i indicate a length of OFDM symbol, a length of CP (Cyclic Prefix) and an index of OFDM symbol, respectively. r means a vector of a received signal in a receiver. Here, the equation $y_{\tilde{n},i} \triangleq r[\tilde{n}+i(N+N_g): \tilde{n}+i(N+N_g)+N-1]$ is a vector defined with elements ranging from $(\tilde{n}+i(N+N_g))$th element to $(\tilde{n}+i(N+N_g)+N-1)$th element of the received signal vector r.

The algorithm of Equation 3 operates on the condition that 2 OFDM received signals adjacent to each other temporally are equal to each other. Since such an algorithm can use a sliding window scheme, it can be implemented with low complexity and has a property robust to a frequency offset.

Meanwhile, Equation 4 represents an algorithm of performing timing synchronization using correlation between a received signal and a signal transmitted by a base station.

$$\hat{n} = \arg\max_{\tilde{n}} \frac{\left|\sum_{i=0}^{A-1} y_{\tilde{n},i}^H s\right|^2}{\sum_{i=0}^{A-1} |y_{\tilde{n},i}|^2 \sum_{i=0}^{A-1} |s|^2} \quad \text{[Equation 4]}$$

In Equation 4, s means a signal transmitted by a base station and is a signal vector pre-agreed between a UE and a base station. Although the way of Equation 4 may have performance better than that of Equation 3, since Equation 4 cannot be implemented by a sliding window scheme, it requires high complexity. And, the way of Equation 4 has a property vulnerable to a frequency offset.

In continuation with the description of the timing synchronization scheme, a beam scanning procedure is described as follows. First of all, a beam scanning means an operation of a transmitter and/or a receiver that looks for a direction of a beam that maximizes a received SINR of the receiver. For example, a base station determines a direction of a beam through a beam scanning before transmitting data to a UE.

Further description is made by taking FIG. 4 as one example. FIG. 4 shows that a sector serviced by a single base station is divided into 8 areas. Here, the base station transmits a beam to each of (A1+B1), (A2+B2), (A3+B3) and (A4+B4) areas, and a UE can identify the beams transmitted by the base station. On this condition, a beam scanning procedure can be embodied into 4 kinds of processes. First of all, the base station transmits beams to 4 areas in sequence [i]. The UE determines a beam decided as a most appropriate beam among the beams in aspect of a received SINR [ii]. The UE feds back information on the selected beam to the base station [iii]. The base station transmits data using a beam having the direction of the feedback [iv]. Through the above beam scanning procedure, the UE can receive DL data through a beam having an optimized received SINR.

Zadoff-Chu sequence is described in the following. Zadoff-Chu sequence is called Chu sequence or ZC sequence and defined as Equation 5.

$$x_r[n] = e^{\frac{j\pi r n(n+1)}{N}} \quad \text{[Equation 5]}$$

In Equation 5, N indicates a length of sequence, r indicates a root value, and $x_r[n]$ indicates an nth element of ZC sequence. The ZC sequence is characterized in that all elements are equal to each other in size [constant amplitude]. Moreover, a DFT result of ZC sequence is also identical for all elements.

In the following, ZC sequence and a cyclic shifted version of the ZC sequence have the following correlation such as Equation 6.

$$(x_r^{(i)})^H x_r^{(j)} = \begin{cases} N & \text{for } i = j \\ 0 & \text{elsewhere} \end{cases} \quad \text{[Equation 6]}$$

In Equation 6, $X_r^{(i)}$ is a sequence resulting from cyclic-shifting $X_r$ by i, and indicates 0 except a case that auto-correlation of ZC sequence is i=j. The ZC sequence also has zero auto-correlation property and may be expressed as having CAZAC (Constant Amplitude Zero Auto Correlation) property.

Regarding the final property of the ZC sequence ZC, the correlation shown in Equation 7 is established between ZC sequences having a root value that is a coprime of a sequence length N.

$$x_{r_1}^H x_{r_2} = \begin{cases} N & \text{for } r_1 = r_2 \\ \frac{1}{\sqrt{N}} & \text{elsewhere} \end{cases} \quad \text{[Equation 7]}$$

In equation 7, r1 or r2 is a coprime of N. For example, if N=111, $2 \leq r_1, r_2 \leq 110$ always meets Equation 7. Unlike auto-correlation of Equation 6, the mutual correlation of ZC sequence does not become 0 completely.

In continuation with ZC sequence, Hadamard matrix is described. The Hadamard matrix is defined as Equation 8.

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}} \quad \text{[Equation 8]}$$

where $H_1 = [1]$ $$H_2 = \begin{bmatrix} 1 & 1 \\ 1 & -1 \end{bmatrix}$$

In Equation 8, $2^k$ indicates a size of matrix. Hadamard matrix is a unitary matrix that always meets $H_n H_n^T = nI_n$ irrespective of a size n. Moreover, in Hadamard matrix, all columns and all rows are orthogonal to each other. For example, if n=4, Hadamard matrix is defined as Equation 9.

First of all, a UE calculates a pathloss using a received synchronization signal and a beam scanning signal and then determines a transmit power based on the calculation. Table 3 shows a pathloss of UE and a corresponding transmit power.

TABLE 3

| UE | preambleInitialReceivedTargetPower | Pathloss | Necessary transmit power | Transmit power | Additional necessary power |
|---|---|---|---|---|---|
| K1 | −104 dBm | 60 dB | −44 dBm | −44 dBm | 0 dBm |
| K2 | −104 dBm | 110 dB | 6 dBm | 6 dBm | 0 dBm |
| K3 | −104 dBm | 130 dB | 26 dBm | 23 dBm | 3 dBm |

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{[Equation 9]}$$

From Equation 9, it can be observed that columns and rows are orthogonal to each other.

Figure 6:
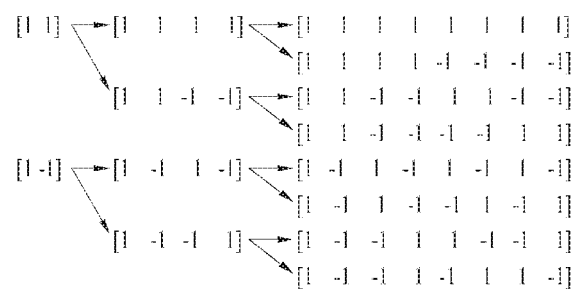
FIG. 6 shows a structure of OVSF (orthogonal variable spreading factor) code.

FIG. 6 shows a structure of OVSF (orthogonal variable spreading factor) code. The OVSF code is the code generated on the basis of Hadamard matrix and has specific rules.

First of all, in diverging to the right in the OVSF code [lower branch], a first code repeats a left mother code twice as it is and a second code is generated from repeating an upper code once, inverting it and then repeating the inverted code once. FIG. 6 shows a tree structure of OVSF code.

Such an OVSF code secures all orthogonality except the relation between adjacent mother and child codes on a code tree. For example, in FIG. 6, a code [1 −1 1 −1] is orthogonal to all of [1 1], [1 1 1 1], and [1 1 −1 −1]. Moreover, regarding the OVSF code, a length of code is equal to the number of available codes. Namely, it can be observed from FIG. 6 that a length of a specific ode is equal to the total number in a branch having the corresponding code belong thereto.

Figure 7:
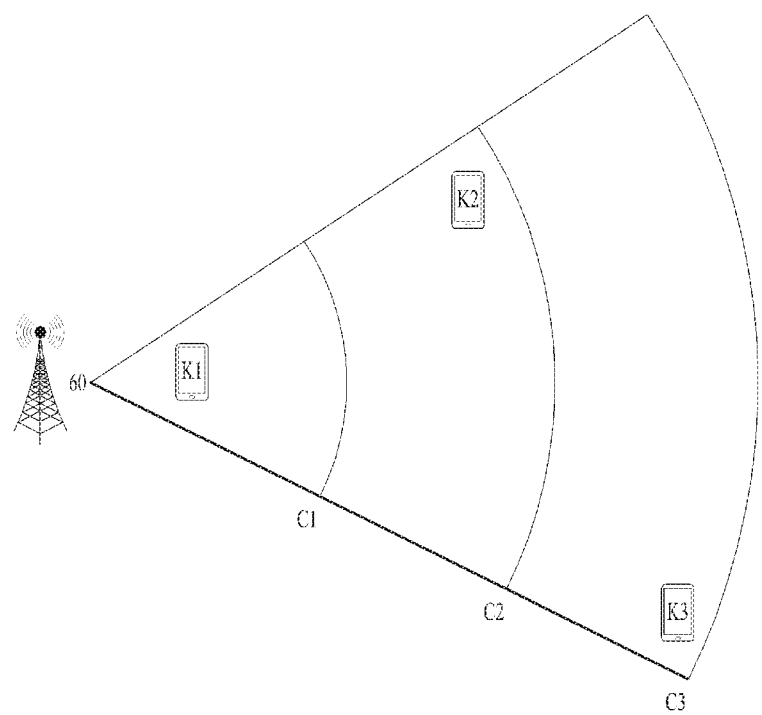
FIG. 7 is a diagram to describe a disposed situation of user equipments.

FIG. 7 is a diagram to describe a disposed situation of user equipments. RACH (Random Access CHannel) is described with reference to FIG. 7.

In case of LTE system, when RACH signals transmitted by UEs arrive at a base station, powers of the RACH signals of UEs received by the base station should be equal to each other. To this end, the base station defines a parameter 'preambleInitialReceivedTargetPower', thereby broadcasting the parameter to all UEs within a corresponding cell through SIB (System Information Block) 2. The UE calculates a pathloss using a reference signal, and then determines a transmit power of the RACH signal using the calculated pathloss and the parameter 'preambleInitialReceivedTargetPower' like Equation 10.

$$P\_PRACH\_Initial = \min\{P\_CMAX, \text{preambleInitialReceivedTargetPower} + PL\} \quad \text{[Equation 10]}$$

In Equation 10, P_PRACH_Initial, P_CMAX, and PL indicate a transmit power of RACH signal, a maximum transmit power of UE, and a pathloss, respectively.

Equation 10 is taken as one example for the following description. A maximum transmittable power of UE is assumed as 23 dBm, and a RACH reception power of a base station is assumed as −104 dBm. And, a UE disposed situation is assumed as FIG. 7.

In case of a UE K1 in table 3, a pathloss is very small. Yet, in order to match an RACH reception power, an RACH signal should be transmitted with very small power (−44 dBm). Meanwhile, in case of a UE K2, although a pathloss is big, a necessary transmit power is 6 dBm. Yet, in case of a UE K3, since a pathloss is very big, a necessary transmit power exceeds P_CMA=23 dBm. In this case, the UE should perform a transmission with 23 dBm that is a maximum transmit power and a rate of UE's RACH access success is degraded by 3 dB.

In the following, phase noise related to the present invention is explained. Jitter generated on a time axis appears as phase noise on a frequency axis. As shown in equation 11 in the following, the phase noise randomly changes a phase of a reception signal on the time axis.

$$r_n = s_n e^{j\phi_n} \quad \text{[Equation 11]}$$

$$\text{where } s_n = \sum_{k=0}^{N-1} d_k e^{j2\pi \frac{kn}{N}}$$

Parameters of the equation 11 respectively indicate a reception signal, a time axis signal, a frequency axis signal, and a phase rotation value due to the phase noise. In the equation 11, if the reception signal is passing through a DFT (Discrete Fourier Transform) procedure, it may be able to have equation 12 described in the following.

$$y_k = d_k \frac{1}{N} \sum_{n=0}^{N-1} e^{j\phi_n} + \frac{1}{N} \sum_{\substack{t=0 \\ t \neq k}}^{N-1} d_t \sum_{n=0}^{N-1} e^{j\phi_n} e^{j2\pi(t-k)m/N} \quad \text{[Equation 12]}$$

In the equation 12, $$\frac{1}{N} \sum_{n=0}^{N-1} e^{j\phi_n}, \frac{1}{N} \sum_{\substack{t=0 \\ t \neq k}}^{N-1} d_t \sum_{n=0}^{N-1} e^{j\phi_n} e^{j2\pi(t-k)m/N}$$

indicate a CPE (common phase error) and ICI (inter-cell interference), respectively. In this case, as correlation between phase noises is getting bigger, the CPE of the equation 12 has a bigger value. The CPE is a sort of CFO (carrier frequency offset) in a wireless LAN system. However, since the CPE corresponds to phase noise in the aspect of a terminal, the CPE and the CFO can be similarly comprehended.

A terminal eliminates the CPE/CFO corresponding to phase noise on a frequency axis by estimating the CPE/CFO. A procedure of estimating the CPE/CFO on a reception signal should be preferentially performed by the terminal to accurately decode the reception signal. In particular, in order to make the terminal precisely estimate the CPE/CFO, a base station can transmit a prescribed signal to the terminal. The signal transmitted by the base station corresponds to a signal for eliminating phase noise. The signal may correspond to a pilot signal shred between the terminal and the base station in advance or a signal changed or copied from a data signal. In the following a signal for eliminating phase noise is commonly referred to as a PCRS (Phase Compensation Reference Signal), a PNRS (Phase Noise Reference Signal).

Figure 8:
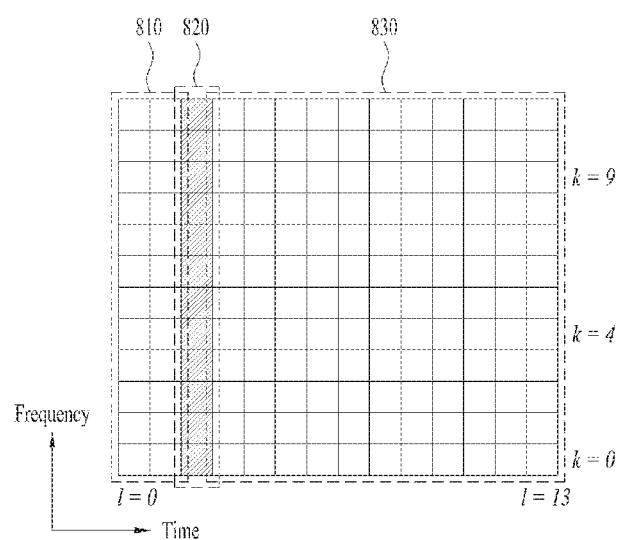
FIG. 8 is a diagram illustrating a structure of a resource region used in a communication system that uses mmWave.

FIG. 8 is a diagram illustrating a resource region structure used in a communication system using mmWave. A communication system using such a ultrahigh frequency band as mmWave uses a frequency band having physical characteristic different from that of a legacy LTE/LTE-A communication system. Hence, it is necessary for the communication system using the ultrahigh frequency band to use a structure of a resource region different from a structure of a resource region used in a legacy communication system. FIG. 8 illustrates an example of a downlink resource structure of a new communication system.

It may consider an RB pair consisting of 14 OFDM (Orthogonal Frequency Division Multiplexing) symbols in a horizontal axis and 12 subcarriers in a vertical axis. In this case, first 2 (or 3) OFDM symbols 810 are allocated for a control channel (e.g., PDCCH (Physical Downlink Control Channel)), a next one OFDM symbol 820 is allocated for a DMRS (DeModulation Reference Signal), and the remaining OFDM symbols 830 are allocated for a data channel (e.g., PDSCH (Physical Downlink Shared Channel)).

Meanwhile, in the resource region structure shown in FIG. 8, a PCRS for estimating the aforementioned CPE (or, the CFO) or a PNRS can be transmitted to a terminal in a manner of being carried on a partial RE (resource element) of the region 830 to which a data channel is assigned. The signals correspond to a signal for eliminating phase noise. As mentioned in the foregoing description, the signal may correspond to a pilot signal or a signal changed or copied from a data signal.

2. Proposed Information Providing Method

As described above, beamforming to a UE by a base station is important to a communication system that uses an mmWave band. This is because pathloss increases in case of using a high frequency band more. Hence, if a UE determines that a beam mismatch is considerable on the basis of a signal received from a base station, the UE needs to transmit information related to beamforming to the base station and receive relevant information from the base station in order to resolve the beam mismatch. In the following description, an embodiment for a UE to transmit information related to beamforming to a base station and receive relevant information from the base station is proposed. For clarity of description, beamforming related information (or beam related control information) transmitted to a base station by a UE shall be commonly called Beam State Information (BSI).

In case that a UE rotates or a blockage is caused, as described above, there may be a beam mismatch. In this case, the UE can request a Beam Refinement Reference Signal (BRRS) using a Scheduling Request (SR) for a BRRS request. In particular, for beam refinement between a base station and a UE, the base station can repeatedly transmit one of more different beams to the UE. In this case, the BRRS may be a reference signal used for the beam refinement. Through this, it is able to find a most appropriate beam pair between the base station and the UE.

Here, for one example, the BRRS may include a Channel State Information-Reference Signal (CSI-RS). Namely, for a reference signal for beam refinement, CSI-RS can be used as BRRS. For another example, BRRS may include a newly defined reference signal. Namely, BRRS may include a reference signal of a new type used to find a most appropriate beam pair. In the following, a reference signal used for beam refinement shall be uniformly described as a BRRS. Yet, a BRRS may include a CSI-RS. In the following description, a BRRS may indicate the same technical configuration despite being substituted with a CSI-RS. And, the technical features are non-limited by a name of a BRRS.

A BRRS process can be configured in a process form similar to a CSI process in a UE. As described above, since a BRRS may be identical to a CSI-RS, a BRRS process may be configured in form of a CSI process, which is non-limited by the above-described embodiment.

For one example, a BRRS process may be configured through Radio Resource Control (RRC). In this case, information configured through RRC may include at least one of information of antenna ports to be measured by a UE and Virtual Cell ID (VCID) information. As described above, if a BRRS process is configured in a UE through RRC signaling (or higher layer signaling), a base station can transmit Downlink Control information, in which information of a BRRS transmitted time/frequency resource and information of an in-use process index are included, to the UE. The UE can receive a BRRS from the base station based on the received DCI information and perform beam refinement.

For another example, a base station can transmit Medium Access Control-Control Element (MAC-CE), in which the above-described information is included, to a UE instead of DCI. Namely, the base station can transmit control information, in which control information on a BRRS is included at a MAC end, to the UE, which is non-limited by the aforementioned embodiment.

2-1 BRRS Request and BSI Reporting Using Contention-Based Random Access Channel (RACH) Resource As described above, a beam of a UE can have directivity. In this case, if a UE rotates or a blockage is caused, there may be a beam mismatch. If there is the beam mismatch, the UE can request a BRRS using an SR for a BRRS request. Yet, if there is a beam mismatch, time synchronization between a UE and a base station may be mismatched and a Signal Noise Ratio (SNR) level may be configured different from the previous. Hence, if the UE transmits an SR resource to the base station, the base station may not be able to receive the SR resource correctly. Namely, the base station may not be able to receive the SR for the BRRS request from the user equipment correctly.

By considering the aforementioned situation, the USE can make a request for a BRRS using a contention-based RACH resource instead of an SR to the base station. In doing so, an RACH preamble may not be sensitive to a time error and an SNR can be improved through power boosting and repetitive transmission. Moreover, the base station can receive the RACH preamble using a multi-beam instead of a single beam, whereby BRRS information can be transmitted to the base station more efficiently than SR. Hence, the UE can perform beam refinement in a situation of a beam mismatch by requesting a BRRS to the base station using the contention-based RACH resource.

Figure 9:
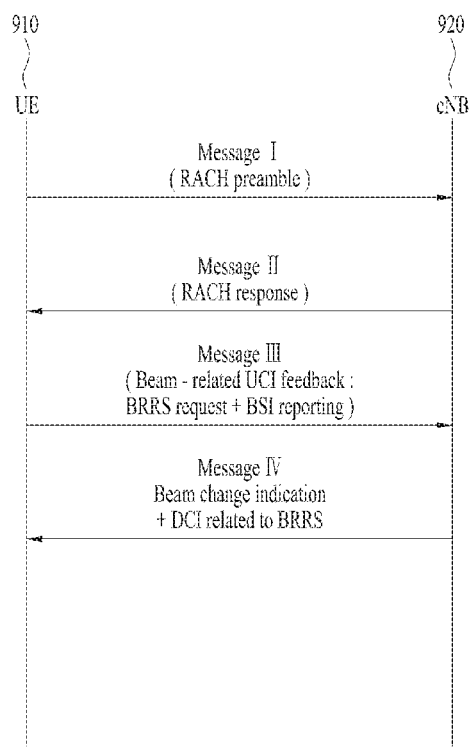
FIG. 9 is a diagram illustrating a structure of a RACH (Random Access Channel) subframe.

In particular, referring to FIG. 9, a UE 910 can make a BRRS request and a BSI reporting to a base station 920 using a contention based RACH procedure. In doing so, since the existing contention based RACH procedure is used for another usage, it is necessary to distinguish the existing contention based RACH procedure and a contention based RACH procedure for a BRRS request/BSI reporting from each other.

In the RACH procedure, the UE 910 can transmit an RAC preamble (Message I) to the base station 920. In doing so, the UE 910 can determine a random RACH sequence and transmit it to the base station 920. After receiving the RACH preamble, the base station can transmit an RACH response (RAR, Message II) to the UE 910. In doing so, information of a resource to be used can be included in the RACH response. Thereafter, the UE 910 can transmit an RRC connection request (Message III) to the base station 920 using a resource designated in the RACH response. Then, the base station 920 can transmit a response message (Message IV) in response to the RRC connection request to the UE 910.

In doing so, for one example, whether it is the existing contention based RACH procedure or the contention based RACH procedure for the BRRS request/BSI reporting can be checked through a UE ID field defined in the aforementioned RRC connection request field. Namely, the base station 920 can distinguish the existing contention based RACH procedure and the contention based RACH procedure for the BRRS request/BSI reporting from each other based on the UE ID field value of the received RRC connection request field. For another example, the UE 910 can inform the base station 920 of a presence or non-presence of a BRRS request using a field added to the RRC connection request.

Figure 10:
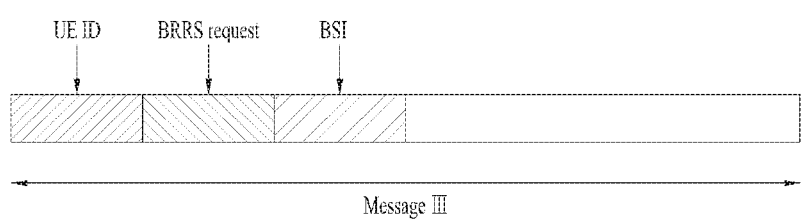
FIG. 10 is a diagram showing information included in an RRC connection request message.

For example, referring to FIG. 10, a UE ID field can be included in an RRC connection request. In this case, C-RNTI information can be included as identification information of a UE in the UE ID field. Namely, the base station 920 can identify the UE 910 through the UE ID field. If the base station 920 receives an RRC connection request message, the base station 920 compares a UE ID already connected to a current system with a UE ID field value of the RRC connection request message, thereby being aware whether the UE 910 is already in a connected state. In doing so, if the base station 920 detects the connected UE ID, it is able to recognize that a beam mismatch occurs in the corresponding UE 910. Namely, in case of receiving an RRC connection request message from the already-connected UE 910 again, the base station 920 can recognize that a contention based RACH procedure according to the beam mismatch is performed. Moreover, for example, at least one of a BRRS request field and a BSI field can be further included in the RRC connection request message as well as the UE ID field. Here, the BRRS request field may be set to 1 bit. If the BRRS request field has a first value, a BRRS request may not be made. If the BRRS request field has a second value, a BRRS request may be made. Here, if the first value is 0, the second value may be 1. If the first value is 1, the second value may be 0. Namely, the BRRS request field can indicate information indicating whether to request a BRRS. Moreover, a position of a field is located in front of an RRC connection request, by which the present invention is non-limited. And, a position and sequence of a field can be changed. Moreover, the number of bits can be additionally extended for other purposes and is non-limited by the aforementioned embodiment.

In this case, if the BRRS request is not made, the base station 920 can transmit an RRC connection request response message to the UE 910 in a manner that a beam change indication information is contained in the RRC connection request response message. Yet, if the BRRS request is made, the base station 920 can transmit an RRC connection request response message to the UE 910 in a manner that beam change indication information and BRRS related DCI information (DCI related to BRRS) are contained in the RRC connection request response message. In this case, as described above, BRRS time/frequency resource information and BRRS process index information may be necessary to receive a BRRS, and information on the necessary information may be included in DCI. Hence, the base station 920 transmits the RRC connection request response message in a manner that the BRRS related DCI information is further contained in the RRC connection request response message as well as the beam change indication information, thereby being able to deliver the information necessary for the BRRS reception to the UE 910.

Beam change indication information may be included in the RRC connection request response irrespective of a presence or non-presence of a BRRS request. And, the base station 920 can inform the UE that a serving beam has been changed on the basis of BSI information included in an RRC connection request. Moreover, the base station 920 can additionally transmit control information related to a BRRS transmission. In doing so, for example, beam change indication information and control information related to BRRS transmission may be transmitted as one DCI or another DCI, which will be described later.

Namely, the base station 920 can check whether the BRRS request/BSI information is included through the UE ID field of the RRC connection request message transmitted by the UE 910.

In this case, for the BRRS request of the related art, a base station and a UE should have a beam matched, the base station should assign an SR for a BRRS request to the UE, the UE transmits the BRRS request to the base station through the assigned SR, and the base station can transmit a BSSR to the UE after sending BRRS related DCI to the UE. Namely, a lot of procedures are required for requesting a BRRS based on a mean mismatch. Yet, in case of indicating it using a UI ID field and additional field of an RRC connection request like the above-described method, unnecessary procedures can be omitted, whereby efficiency can be improved.

For another example, a base station can transmit the above-described information to a UE in a manner that the corresponding information is included not in DCI but in MAC-CE. Namely, configuration of substituting DCI with MAC-CE in the above description may be possible. The base station can transmit control information on beam refinement to the UE in a manner that the control information is included in MAC-CE, which is non-limited by the aforementioned embodiment.

2-2 Method for a Base Station to Inform a UE of a Presence or Non-Presence of a Use of an Existing BRRS Process Using DCI A BRRS process can be configured in a UE through RRC signaling, and a base station can inform the UE of time/frequency resource information of a BRRS and a BRRS process index through DCI, which is mentioned in the foregoing description.

In doing so, if a beam mismatch occurs due to a movement of the UE or a blockage, it is necessary to modify a BRRS process previously configured in the UE. Moreover, the base station may recognize the beam mismatch through a contention based RACH procedure of the already-connected UE. In this case, the base station can determine whether a beam change is necessary by receiving an RRC connection request containing a BRRS request and BSI information from the UE. The base station can indicate whether to modify the BRRS process configured in the UE through DCI and configure a DCI format for such indication.

Figure 11:
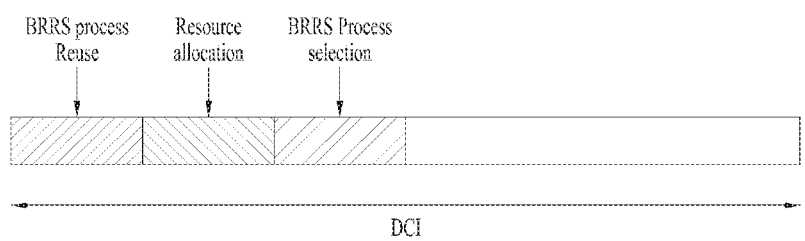
FIG. 11 is a diagram showing a DCI format including beam refinement information.

For one example, although a beam mismatch occurs, a BRRS process configured in a UE can be maintained. Namely, an existing BRRS process can be reused. FIG. 11 shows a DCI format in case of using an existing BRRS process as it is. Referring to FIG. 11, a BRRS process reuse field may be included in DCI. If the BRRS process reuse field has a first value, it can indicate that a BRRS process configured in a UE is reused. At least one of a BRRS resource allocation field and a BRRS process selection field can be further included in the DCI. Here, the BRRS resource allocation field may indicate time and frequency resources on which a BRRS is transmitted. The BRRS process selection field can indicate a process to be used, by which the present invention is non-limited.

Figure 12:
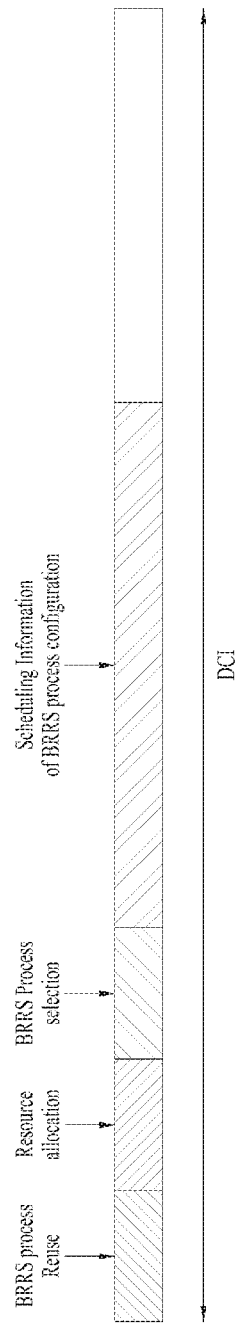
FIG. 12 is a diagram showing a DCI format including beam refinement information.

For another example, FIG. 12 is a diagram showing a DCI format in case of not using an existing BRRS process. Referring to FIG. 12, if a BRRS process reuse field has a second value, an existing BRRS process may not be reused. Here, a field indicating scheduling information of BRRS process configuration may be further included in a DCI format as well as the aforementioned BRRS resource allocation field and the aforementioned BRRS process selection field. Namely, a scheduling information field for the BRRS process configuration may be further included. A UE can update the BRRS process configuration using the scheduling information. After updating the BRRS process configuration using the scheduling information, as described above, the UE can receive a BRRS from a base station using the information included in the BRRS resource allocation field and the BRRS process selection field.

For one example, the BRRS process reuse field may be 1 bit. Here, if the aforementioned first value is set to 0, the second value can be set to 1. Moreover, if the aforementioned first value is set to 1, the second value can be set to 0. Additional bit configuration or a position change for an additional purpose is available for the BRRS process reuse field, by which the present invention is non-limited.

For another example, if the BRRS process reuse field has the second value, an existing BRRS process may not be reused. In this case, a DCI format may be configured like FIG. 13. The DCI format may be configured with a BRRS process reuse field and a field indicating scheduling information of BRRS process configuration only. Namely, a BRRS resource allocation field and a BRRS process selection field may not be included in the DCI format. In this case, a UE can update the BRRS process configuration only using the scheduling information of the BRRS process configuration. A base station additionally transmits the DCI defined in FIG. 11 to the UE, thereby enabling the UE to prepare for BRRS reception. Namely, information on BRRS process configuration and information on BRRS resource allocation and selection can be transmitted in a manner of being separated from each other.

For another example, a UE can update BRRS process configuration using scheduling information of the BRRS process configuration and then request a BRRS transmission using an SR for a BRRS request assigned later, by which the present invention is non-limited. For another example, in the DCI format shown in one of FIGS. 11 to 13, a beam change indication field can be further included, by which the present invention is non-limited.

Figure 13:
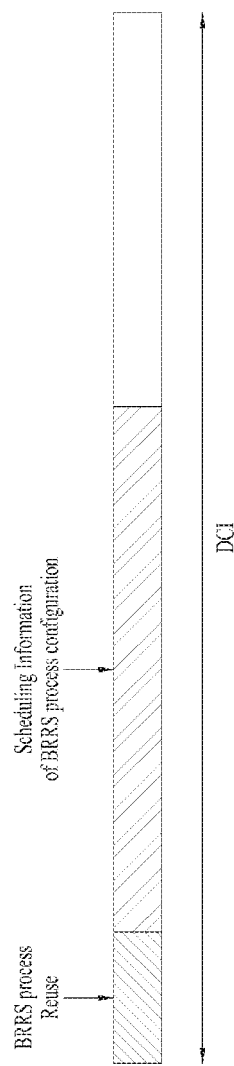
FIG. 13 is a diagram showing a DCI format including beam refinement information.

For another example, the BRRS process reuse field described in FIGS. 11 to 13 can be used by being defined as a different meaning. In particular, the BRRS process reuse field can be used for the purpose of indicating a presence or non-presence of scheduling information of BRRS process configuration. For example, if a BRRS process reuse field has a first value, a UE recognizes that scheduling information is included and is then able to update BRRS process configuration. Yet, if the BRRS process reuse field has a second value, the UE recognizes that there is no scheduling information and is able to use an existing BRRS process as it is. Namely, the BRRS process reuse field can be used as information indicating a presence or non-presence of the scheduling information of the BRRS process configuration. In this case, the BRRS process reuse field may be 1 bit. If the first value is set to 0, the second value can be set to 1. If the first value is set to 1, the second value can be set to 0. Additional bit configuration or a position change for an additional purpose is available for the BRRS process reuse field, by which the present invention is non-limited.

For further example, a base station can transmit the above-described information to a UE in a manner that the aforementioned information is included not in DCI but in MAC-CE. Namely, configuration of substituting DCI with MAC-CE in the above description may be possible. The base station can transmit control information on beam refinement to the UE in a manner that the control information is included at a MAC end, which is non-limited by the aforementioned embodiment.

Figure 14:
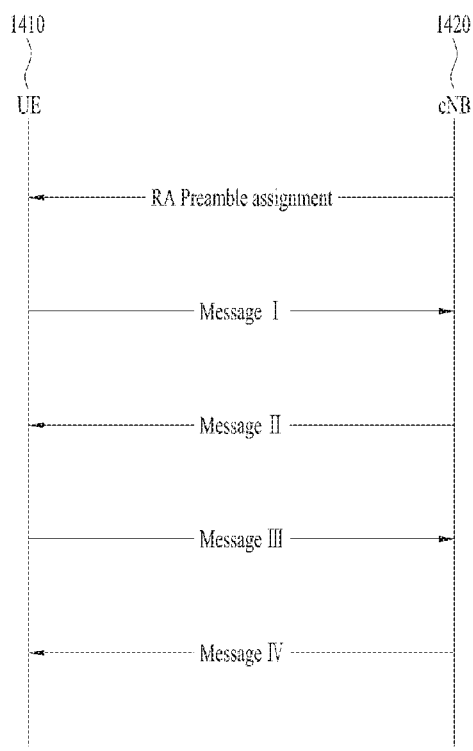
FIG. 14 is a diagram showing a method of performing beam refinement based on a non-contention based RACH procedure.

2-3 BRRS Request and BSI Reporting Using a Non-Contention Based Random Access CHannel (RACH) Resource As described above, a UE can perform a BRRS request and a BSI reporting on a base station using a contention based RACH procedure. Moreover, for example, referring to FIG. 14, a UE 1410 can perform a BRRS request and a BSI reporting on a base station 1420 using a non-contention based RACH procedure.

In particular, the UE 1410 can receive RACH preamble assignment information from the base station 1420. In this case, the UE 1410 can transmit an RACH preamble to the base station 1420 through a resource indicated by the RACH preamble assignment information received from the base station 1420. Namely, since the UE 1410 received resource information for transmitting an RACH preamble from the base station 1420, it is able to transmit an RACH preamble (Message I) through a specific resource without performing contention with other UEs. If so, the UE 1410 can receive an RACH preamble response (Message II) from the base station 1420. Thereafter, the UE 1410 can transit an RRC connection request (Message III) to the base station 1420. In doing so, for example, a UE ID field may be included in the RRC connection request. In this case, through the UE ID field, the base station 1420 can be aware whether the UE performs an existing RACH procedure or an RACH procedure for a BRRS request and a BSI reporting, which may be identical to the former description with reference to FIG. 9.

Moreover, at least one of a BRRS request field and a BSI information field may be further included in the RRC connection request transmitted by the UE 1410 in addition. Through this, the UE 1410 can transmit a BRRS request and BSI information to the base station 1420, which may be identical to the former description with reference to FIG. 10.

Thereafter, the base station 1420 can transmit a response message (Message IV) to the UE 1410 in response to the RRC connection request. In doing so, the base station 1420 can check UE IF field information of the received RRC connection request message and then transmit beam change indication information to the UE 1410 in a manner that the beam change indication information is included in the response message in response to the RRC connection request. For example, the base station 1420 can additionally transmit DCI information on a BRRS based on a BRRS request field of an RRC connection request message, which may be identical to the former description with reference to FIG. 10.

Moreover, for example, the base station 1420 can configure a DCI format to inform the UE 1410 of information on a presence or non-presence of a BRRS process use, which may be identical to the former descriptions with reference to FIGS. 11 to 13.

Namely, the UE 1410 receives resource information on an RACH preamble in a non-contention based RACH procedure, transmits an RACH preamble on a designated resource to the base station 1420, and is then able to perform a BRRS request and a BSI reporting based on it, which is non-limited by the aforementioned embodiment.

For another example, a base station can transmit the above-described information to a UE in a manner that the corresponding information is included not in DCI but in MAC-CE. Namely, configuration of substituting DCI with MAC-CE in the above description may be possible. The base station can transmit control information on beam refinement to the UE in a manner that the control information is included in MAC-CE, which is non-limited by the aforementioned embodiment.

Figure 15:
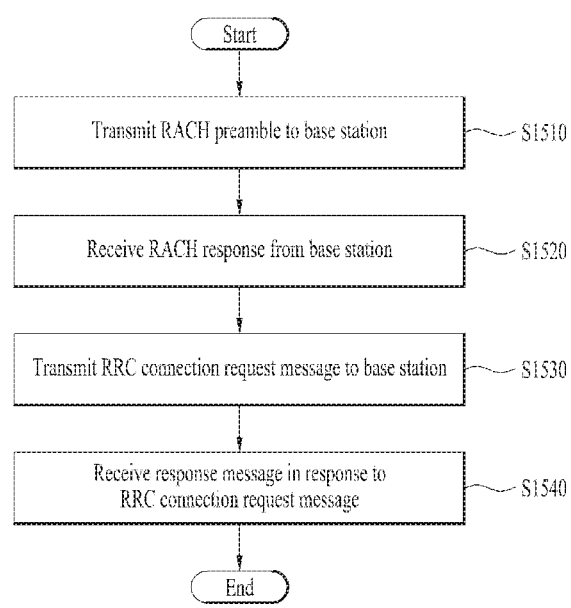
FIG. 15 is a flowchart for a method of performing beam refinement in a communication system.

FIG. 15 is a diagram showing a method of performing beam refinement in a communication system.

A UE can transmit an RACH preamble to a base station [S1510]. Thereafter, the UE can receive an RACH response from the base station [S1520]. In doing so, as described in FIGS. 1 to 14, the UE can transmit an RACH preamble to the base station based on a contention based RACH procedure. Moreover, for example, the UE can transmit an RACH preamble to the base station through a resource designated by the base station based on a non-contention based RACH procedure, which is the same as described above.

Subsequently, the UE can transmit an RRC connection request message to the base station [S1530]. In doing so, as described in FIGS. 1 to 14, a UE ID field may be included in the RRC connection request message. In this case, if an ID of a UE already connected to the base station is included in the UE ID field of the RRC connection request message, the base station can detect a beam mismatch. Namely, if the beam mismatch occurs, the UE can transmit an RRC connection request message containing ID information of the UE to the already-connected base station. Through this, it is able to detect a presence or non-presence of the beam mismatch, which is the same as described above. In this case, for example, at least one of a BRRS request field and VIS information may be further included in the RRC connection request message. For Example, a BRRS may be a CSI-RS and BSI information may be CSI information. Namely, as described above, a BRRS may be regarded as a CSI-RS despite being described, which is non-limited by the aforementioned embodiment. Moreover, for example, if a BRRS request filed has a first value, the base station can transmit DCI information on BRRS to the UE. Namely, the base station can transmit control information necessary for BRRS transmission to the UE, which is the same as described above. In this case, at least one of a BRRS process reuse field, a BRRS resource allocation field and a BRRS process selection field can be further included in DCI, which is the same as described above.

Subsequently, the UE can receive a response message in response to the RRC connection request message from the base station [S1540]. In this case, as described in FIGS. 1 to 14, if the base station detects a beam mismatch, beam change indication information can be included in the response message in response to the RRC connection request message. Namely, if a UE ID field of the RRC connection request message matches an ID of a UE already connected to the base station, beam change indication information can be included in the response message of the RRC connection request message. Moreover, for example, control information on a BRRS can be further included in the response message of the RRC connection request message. In this case, for example, the information on the BRRS can be transmitted on the basis of the aforementioned DCI format, which is the same as described above.

Figure 16:
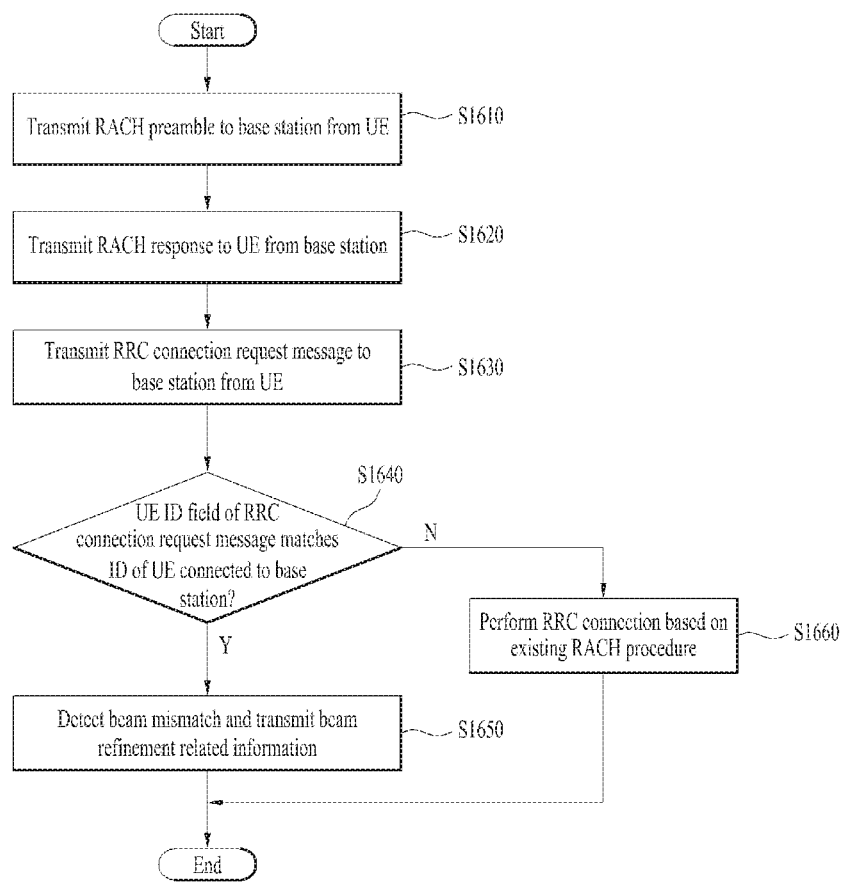
FIG. 16 is a flowchart for a method of performing beam refinement in a communication system.

FIG. 16 is a diagram showing a method of performing beam refinement in a communication system. Referring to FIG. 16, a UE can transmit an RACH preamble to a base station [S1610]. The base station can transmit an RACH response in response [S1620]. In doing so, as described in FIGS. 1 to 15, an RACH procedure can be performed on the basis of contention or non-contention, which is the same as described above.

Subsequently, the UE can transmit an RRC connection request message to the base station [S1630]. In this case, it is able to check whether the RACH procedure is an RACH procedure for the existing RRC connection or an RACH procedure for beam refinement based on a UE ID field of the RRC connection request message.

If the UE ID of the RRC connection request message matches an ID of a UE connected to the base station [S1640], the base station can detect a beam mismatch and transmit beam refinement related information to the UE [S1650]. In this case, as described in FIGS. 1 to 15, it is not necessary for the UE to perform an RACH procedure with the already-connected base station. Hence, an additionally performed RACH procedure can be determined as a procedure for requesting information on a beam mismatch in a sense of a new information request. Namely, the base station receives an RRC connection request message containing the same ID information from the already-connected UE, thereby detecting a beam mismatch. Thereafter, the base station can transmit informations for beam refinement to the UE. In doing so, the informations for beam refinement can be transmitted on the basis of a DCI format, which is the same as described above.

On the contrary, if the UE ID of the RRC connection request message fails to match the ID of the UE connected to the base station [S1640], the base station can perform an RRC connection with the UE based on the existing RACH procedure [S1660]. In doing so, as described in FIGS. 1 to 15, regarding an unconnected UE, the base station can perform the RRC connection with the UE on the basis of a UE ID information field of the RRC connection request message. Namely, the base station can perform the RRC connection with the UE in the same manner of the existing RACH procedure, which is the same as described above.

Device Configuration

Figure 17:
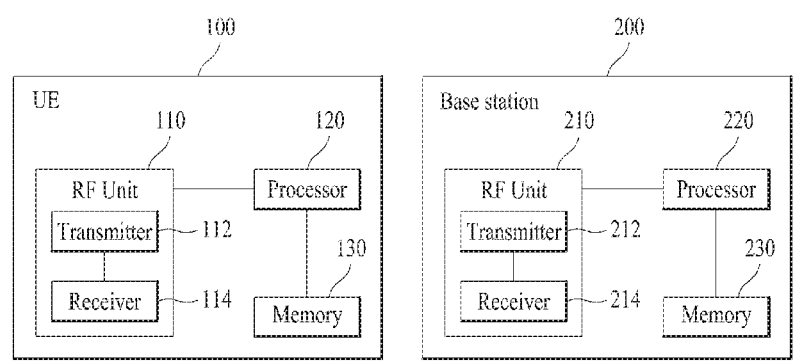
FIG. 17 is a diagram showing configurations of a user equipment and base station related to an embodiment of the present invention.

FIG. 17 is a block diagram showing the configuration of a user equipment and a base station according to one embodiment of the present invention. In FIG. 17, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 17, a communication environment may be established between a plurality of user equipment and the base station. In addition, the base station 200 shown in FIG. 17 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments and the processor 120 is functionally connected to the transmitter 112 and the receiver 114 to control a process of, at the transmitter 112 and the receiver 114, transmitting and receiving signals to and from other devices. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other devices. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein. Those skilled in the art will appreciate that the present invention may be carried out in other specific ways than those set forth herein without departing from the spirit and essential characteristics of the present invention. The above embodiments are therefore to be construed in all aspects as illustrative and not restrictive.

In the present specification, both an apparatus invention and a method invention are described and descriptions of both inventions are applicable supplementarily.

INDUSTRIAL APPLICABILITY

The aforementioned contents can be applied not only to 3GPP system and LTE-A but also to various wireless communication systems including an IEEE 802.16x system and IEEE 802.11x system. Further, the proposed method can also be applied to an mmWave communication system using ultrahigh frequency band.

What is claimed is:

1. A method for performing beam refinement by a User Equipment (UE) in an mmWave communication system, the method comprising:
    transmitting, to a base station (BS), a Random Access CHannel (RACH) preamble;
    receiving, from the BS, an RACH response;
    transmitting, to the BS, an RRC connection request message including at least one of a Channel State Information-Reference Signal (CSI-RS) request field and Channel State Information (CSI); and
    receiving, from the BS, a response message in response to the RRC connection request message based on a detection of a beam mismatch,
    wherein, when the beam mismatch is detected, ID information of the UE is included in a UE ID field of the RRC connection request message,
    wherein, based on the CSI-RS request field set to a first value, information on a CSI-RS is received through at least one of Downlink Control Information (DCI) and Medium Access Control-Control Element (MAC-CE),
    wherein at least one of a CSI-RS process reuse field, a CSI-RS resource allocation field, and a CSI-RS process selection field is received together with the information on the CSI-RS, and
    wherein, based on the CSI-RS process reuse field set to a first value, scheduling information on CSI-RS process configuration is received together with the information on the CSI-RS.

2. The method of claim 1,
    wherein, when the beam mismatch is detected, the response message includes beam change indication information.

3. The method of claim 1,
    wherein the CSI-RS resource allocation field indicates time and frequency resource information for transmitting the CSI-RS and the CSI process selection field indicates a process used for transmitting the CSI-RS.

4. The method of claim 1,
    wherein the CSI information is Beam State Information (BSI) and the CSI-RS is a Beam Refinement Reference Signal (BRRS).

5. The method of claim 4,
wherein the CSI-RS request field is a BRRS request field, the CSI-RS process reuse filed is a BRRS process reuse field, the CSI-RS resource allocation field is a BRRS resource allocation field, the CSI-RS process selection field is a BRRS process selection field, and the CSI-RS process configuration is BRRS process configuration.

6. A user equipment (UE) for performing beam refinement in an mmWave communication system, the UE comprising:
a receiver for receiving a signal;
a transmitter for transmitting; and
a processor configured to control the receiver and the transmitter,
wherein the processor is further configured to:
transmit, to a base station (BS), a Random Access CHannel (RACH) preamble;
receive, from the BS, an RACH response;
transmit, to the BS, an RRC connection request message including at least one of a Channel State Information-Reference Signal (CSI-RS) request field and Channel State Information (CSI); and
receive, from the BS, a response message in response to the RRC connection request message based on a detection of a beam mismatch,
wherein, when the beam mismatch is detected, ID information of the UE is included in a UE ID field of the RRC connection request message,
wherein, based on the CSI-RS request field set to a first value, information on a CSI-RS is received through at least one of Downlink Control Information (DCI) and Medium Access Control-Control Element (MAC-CE),
wherein at least one of a CSI-RS process reuse field, a CSI-RS resource allocation field, and a CSI-RS process selection field is received together with the information on the CSI-RS, and
wherein, based on the CSI-RS process reuse field set to a first value, scheduling information on CSI-RS process configuration is received together with the information on the CSI-RS.

7. The user equipment of claim 6, wherein when the beam mismatch is detected, the response message includes beam change indication information.

8. The UE of claim 6,
wherein the CSI-RS resource allocation field indicates time and frequency resource information for transmitting the CSI-RS and the CSI process selection field indicates a process used for transmitting the CSI-RS.

9. The UE of claim 6,
wherein the CSI information is Beam State Information (BSI) and the CSI-RS is a Beam Refinement Reference Signal (BRRS).

10. The UE of claim 9,
wherein the CSI-RS request field is a BRRS request field, the CSI-RS process reuse filed is a BRRS process reuse field, the CSI-RS resource allocation field is a BRRS resource allocation field, the CSI-RS process selection field is a BRRS process selection field, and the CSI-RS process configuration is BRRS process configuration.

* * * * *